(12) United States Patent
Chen et al.

(10) Patent No.: US 10,762,868 B2
(45) Date of Patent: Sep. 1, 2020

(54) MEMORY-IN-PIXEL CIRCUIT AND DRIVING METHOD THEREOF, LIQUID CRYSTAL DISPLAY PANEL AND WEARABLE DEVICE

(71) Applicants: BOE TECHNOLOGY GROUP CO., LTD., Beijing (CN); HEFEI BOE OPTOELECTRONICS TECHNOLOGY CO., LTD., Hefei, Anhui (CN)

(72) Inventors: Yimin Chen, Beijing (CN); Xianjie Shao, Beijing (CN); Zhangmeng Wang, Beijing (CN)

(73) Assignees: BOE TECHNOLOGY GROUP CO., LTD., Beijing (CN); HEFEI BOE OPTOELECTRONICS TECHNOLOGY CO., LTD., Hefei (CN)

(*) Notice: Subject to any disclaimer, the term of this patent is extended or adjusted under 35 U.S.C. 154(b) by 0 days.

(21) Appl. No.: 16/031,440

(22) Filed: Jul. 10, 2018

(65) Prior Publication Data
US 2019/0096354 A1   Mar. 28, 2019

(30) Foreign Application Priority Data
Sep. 25, 2017 (CN) .......................... 2017 1 0876723

(51) Int. Cl.
*G09G 3/36* (2006.01)
*G02F 1/1343* (2006.01)
*G02F 1/133* (2006.01)

(52) U.S. Cl.
CPC ......... *G09G 3/3696* (2013.01); *G02F 1/1343* (2013.01); *G02F 1/13306* (2013.01);
(Continued)

(58) Field of Classification Search
CPC ........................... G09G 3/3659; G09G 3/3648
See application file for complete search history.

(56) References Cited

U.S. PATENT DOCUMENTS

| 8,120,562 B2 | 2/2012 | Watanabe |
| 8,351,238 B2 * | 1/2013 | Shepard ................ G11C 11/412 365/148 |

(Continued)

FOREIGN PATENT DOCUMENTS

| CN | 101196661 A | 6/2008 |
| CN | 102376282 A | 3/2012 |

(Continued)

OTHER PUBLICATIONS

The First Chinese Office Action dated Aug. 2, 2019; Appln. No. 201710876723.1.

(Continued)

*Primary Examiner* — Sepehr Azari (57) ABSTRACT

A memory-in-pixel circuit and a driving method thereof, a liquid crystal display panel and a wearable device are disclosed. The memory-in-pixel circuit includes a latch circuit, a switch circuit and a selection circuit, all transistors included in the latch circuit are first type transistors, and the latch circuit is configured to latch a data voltage and generate a first latch signal and a second latch signal; the switch circuit is configured to provide the data voltage to the latch circuit when the switch circuit is turned on; the selection circuit is configured to apply the first selection signal or the second selection signal to a pixel under control of the first latch signal and the second latch signal, and to continue to apply the first selection signal or the second selection signal to the pixel when the switch circuit is turned off to achieve automatic update of the pixel.

11 Claims, 5 Drawing Sheets

(52) U.S. Cl.
CPC ... *G09G 3/3648* (2013.01); *G09G 2300/0857* (2013.01); *G09G 2310/0264* (2013.01)

(56) References Cited

U.S. PATENT DOCUMENTS

| | | | |
|---|---|---|---|
| 10,121,416 B2 | 11/2018 | Cai | |
| 2011/0033022 A1* | 2/2011 | Zebedee | G09G 3/20 |
| | | | 377/81 |
| 2011/0316897 A1* | 12/2011 | Teranishi | G09G 3/3659 |
| | | | 345/690 |
| 2012/0044215 A1* | 2/2012 | Chen | G09G 3/3648 |
| | | | 345/204 |
| 2012/0287101 A1 | 11/2012 | Miyazawa et al. | |
| 2013/0069966 A1 | 3/2013 | Zhao et al. | |
| 2015/0111558 A1* | 4/2015 | Yang | G04G 21/04 |
| | | | 455/418 |
| 2015/0206479 A1 | 7/2015 | Maeda | |

FOREIGN PATENT DOCUMENTS

| | | | |
|---|---|---|---|
| CN | 102780471 | A | 11/2012 |
| CN | 104793425 | A | 7/2015 |
| CN | 106205494 | A | 12/2016 |
| KR | 100914929 | B1 | 9/2009 |

OTHER PUBLICATIONS

Second Chinese Office Action Application No. 201710876723.1; dated Apr. 3, 2020.

\* cited by examiner

MEMORY-IN-PIXEL CIRCUIT AND DRIVING METHOD THEREOF, LIQUID CRYSTAL DISPLAY PANEL AND WEARABLE DEVICE

The present application claims priority to Chinese patent application No. 201710876723.1, filed on Sep. 25, 2017, the entire disclosure of which is incorporated herein by reference as part of the present application.

TECHNICAL FIELD

Embodiments of the present disclosure relate to a memory-in-pixel circuit and a driving method thereof, a liquid crystal display panel and a wearable device.

BACKGROUND

With appearance of the first smart watch, the smart watch market begins to develop rapidly. In order to reduce power consumption of a display panel, in terms of improvement of liquid crystal technology, memory-in-pixel (MIP) technology has gradually developed. An ultra-low-power reflective liquid crystal display (LCD) panel using the MIP technology can be applied to wearable devices. The LCD panel can not only achieve 64-color display, but also consumes low power.

SUMMARY

At least one embodiment of the present disclosure provides a memory-in-pixel circuit, which comprises: a latch circuit, a switch circuit and a selection circuit, all transistors included in the latch circuit are first type transistors, and the latch circuit is configured to latch a data voltage and generate a first latch signal and a second latch signal; a first end of the switch circuit is electrically connected with a data line to receive the data voltage, a control end of the switch circuit receives a row scan signal, and a second end of the switch circuit is electrically connected with an input end of the latch circuit so as to form a first node, the switch circuit is configured to provide the data voltage to the latch circuit when the switch circuit is turned on; a first control end of the selection circuit is electrically connected with the first node, a second control end of the selection circuit is electrically connected with a first output end of the latch circuit, a first input end of the selection circuit receives a first selection signal, a second input end of the selection circuit receives a second selection signal, and the selection circuit is configured to apply the first selection signal or the second selection signal to a pixel under control of the first latch signal and the second latch signal, and to continue to apply the first selection signal or the second selection signal to the pixel when the switch circuit is turned off, so as to achieve automatic update of the pixel.

For example, in a memory-in-pixel circuit provided by at least one embodiment of the present disclosure, the first type transistors are N-type transistors.

For example, in a memory-in-pixel circuit provided by at least one embodiment of the present disclosure, the latch circuit comprises: a first latch transistor, a first electrode and a gate electrode of the first latch transistor being electrically connected with a first power supply terminal; a second latch transistor, a first electrode of the second latch transistor being electrically connected with a second electrode of the first latch transistor so as to form a second node, a gate electrode of the second latch transistor being electrically connected with a second end of the switch circuit, and a second electrode of the second latch transistor being electrically connected with a second power supply terminal; a third latch transistor, both a first electrode and a gate electrode of the third latch transistor being electrically connected with the first power supply terminal; a fourth latch transistor, a first electrode of the fourth latch transistor being electrically connected with a second electrode of the third latch transistor so as to form a third node, a gate electrode of the fourth latch transistor being electrically connected with the second node, a second electrode of the fourth latch transistor being electrically connected with the second power supply terminal, the third node is further electrically connected with the first node.

For example, in a memory-in-pixel circuit provided by at least one embodiment of the present disclosure, the switch circuit comprises: a first transistor, a gate electrode of the first transistor receiving the row scan signal, a first electrode of the first transistor receiving the data voltage, and a second electrode of the first transistor being electrically connected with the gate electrode of the second latch transistor.

For example, in a memory-in-pixel circuit provided by at least one embodiment of the present disclosure, the selection circuit comprises: a second transistor, a gate electrode of the second transistor being electrically connected with the second electrode of the first transistor and the gate electrode of the second latch transistor respectively, a first electrode of the second transistor receiving the first selection signal, a second electrode of the second transistor being electrically connected with a first end of the pixel, and a second end of the pixel being electrically connected with a reference voltage output terminal to receive a reference voltage; a third transistor, a gate electrode of the third transistor being electrically connected with the second node, a first electrode of the third transistor receiving the second selection signal, and a second electrode of the third transistor being electrically connected with the first end of the pixel and the second electrode of the second transistor respectively.

For example, in a memory-in-pixel circuit provided by at least one embodiment of the present disclosure, a channel width W1 of the first latch transistor, a channel width W2 of the second latch transistor, a channel width W3 of the third latch transistor, and a channel width W4 of the fourth latch transistor have a following relationship: $W2=W4=5W1=5W3$.

For example, in a memory-in-pixel circuit provided by at least one embodiment of the present disclosure, in a case that the row scan signal controls the first transistor to be turned on and the data voltage is a high level signal, a voltage signal of the first node is a high level signal, so the second transistor and the second latch transistor are turned on, a voltage signal of the second node is a low level signal, so the third transistor and the fourth latch transistor are turned off, a voltage signal of the third node is a high level signal, so a positive feedback is formed between the third node and the first node; in a case that the row scan signal controls the first transistor to be turned on and the data voltage is a low level signal, a voltage signal of the first node is a low level signal, so the second transistor and the second latch transistor are turned off, a voltage signal of the second node is a high level signal, so the third transistor and the fourth latch transistor are turned on, a voltage signal of the third node is a low level signal, so a positive feedback is formed between the third node and the first node.

At least one embodiment of the present disclosure provides a memory-in-pixel circuit, which comprises: a latch circuit, a switch circuit and a selection circuit, all transistors included in the latch circuit are first type transistors, and the latch circuit is configured to latch a data voltage and generate a first latch signal and a second latch signal; a first end of the switch circuit is electrically connected with a data line to receive the data voltage, a control end of the switch circuit receives a row scan signal, and the second end of the switch circuit is electrically connected with the selection circuit, and the switch circuit is configured to provide the data voltage to an input end of the latch circuit when the switch circuit is turned on; a first input end of the selection circuit is electrically connected with the a second output end of the latch circuit, a second input end of the selection circuit is electrically connected with a first output end of the latch circuit, a first control end of the selection circuit is configured to receive a first selection signal, and a second control end of the selection circuit is configured to receive a second selection signal, and the selection circuit is configured to apply the first latch signal or the second latch signal to a pixel under control of the first selection signal and the second selection signal, and to continue to apply the first latch signal or the second latch signal to the pixel when the switch circuit is turned off, so as to achieve automatic update of the pixel.

For example, in a memory-in-pixel circuit provided by at least one embodiment of the present disclosure, the first type transistors are N-type transistors.

For example, in a memory-in-pixel circuit provided by at least one embodiment of the present disclosure, the latch circuit comprises: a first latch transistor, a first electrode and a gate electrode of the first latch transistor being electrically connected with a first power supply terminal; a second latch transistor, a gate electrode of the second latch transistor being electrically connected with the first node, a first electrode of the second latch transistor being electrically connected with a second electrode of the first latch transistor so as to form a second node, and a second electrode of the second latch transistor being electrically connected with a second power supply terminal; a third latch transistor, both a first electrode and a gate electrode of the third latch transistor being electrically connected with the first power supply terminal; a fourth latch transistor, a first electrode of the fourth latch transistor being electrically connected with a second electrode of the third latch transistor so as to form a third node, a gate electrode of the fourth latch transistor being electrically connected with the second node, a second electrode of the fourth latch transistor being electrically connected with the second power supply terminal, the third node is further electrically connected with the first node, the input end of the latch circuit comprises the first node, the first output end of the latch circuit comprises the second node, and the second output end of the latch circuit comprises the third node.

For example, in a memory-in-pixel circuit provided by at least one embodiment of the present disclosure, the first latch signal comprises a voltage signal of the second node, and the second latch signal comprises a voltage signal of the third node.

For example, in a memory-in-pixel circuit provided by at least one embodiment of the present disclosure, a channel width of the first latch transistor is identical to a channel width of the third latch transistor, a channel width of the second latch transistor is identical to a channel width of the fourth latch transistor, and the channel width of the first latch transistor is smaller than the channel width of the second latch transistor.

For example, in a memory-in-pixel circuit provided by at least one embodiment of the present disclosure, the channel width W1 of the first latch transistor and the channel width W2 of the second latch transistor have a following relationship: W2≥5W1.

For example, in a memory-in-pixel circuit provided by at least one embodiment of the present disclosure, the selection circuit comprises: a second transistor, a gate electrode of the second transistor being configured to receive the first selection signal, a first electrode of the second transistor being electrically connected with the first node, a second electrode of the second transistor being electrically connected with a first end of the pixel, and a second end of the pixel being electrically connected with a reference voltage output terminal to receive a reference voltage; a third transistor, a gate electrode of the third transistor being configured to receive the second selection signal, a first electrode of the third transistor being electrically connected with the second node, and a second electrode of the third transistor being electrically connected with the first end of the pixel.

For example, in a memory-in-pixel circuit provided by at least one embodiment of the present disclosure, the switch circuit comprises: a first transistor, a gate electrode of the first transistor receiving the row scan signal, a first electrode of the first transistor receiving the data voltage, and a second electrode of the first transistor being electrically connected with the first electrode of the second transistor.

For example, in a memory-in-pixel circuit provided by at least one embodiment of the present disclosure, the selection circuit comprises: a second transistor, a gate electrode of the second transistor being configured to receive the first selection signal, a first electrode of the second transistor being electrically connected with the first node, a second electrode of the second transistor being electrically connected with a first end of the pixel, and a second end of the pixel being electrically connected with a reference voltage output terminal to receive a reference voltage; a third transistor, a gate electrode of the third transistor being configured to receive the second selection signal, a first electrode of the third transistor being electrically connected with the second node, and a second electrode of the third transistor being electrically connected with the first end of the pixel.

For example, in a memory-in-pixel circuit provided by at least one embodiment of the present disclosure, the switch circuit comprises: a first transistor, a gate electrode of the first transistor receiving the row scan signal, a first electrode of the first transistor receiving the data voltage, and a second electrode of the first transistor being electrically connected with the second electrode of the second transistor and the second electrode of the third transistor.

At least one embodiment of the present disclosure further provides a driving method for driving a memory-in-pixel circuit, which comprises: turning on the switch circuit to transmit the data voltage to the latch circuit; latching the data voltage and generating a first latch signal and a second latch signal through the latch circuit, and applying the first latch signal or the second latch signal to a pixel; when the switch circuit is turned off, continuing to apply the first latch signal or the second latch signal to the pixel to achieve automatic update of the pixel.

At least one embodiment of the present disclosure further provides a liquid crystal display panel, comprising any one of the memory-in-pixel circuits described above.

At least one embodiment of the present disclosure further provides a wearable device, comprising any one of the liquid crystal display panel described above.

BRIEF DESCRIPTION OF THE DRAWINGS

In order to clearly illustrate the technical solutions of the embodiments of the disclosure, the drawings of the embodiments will be briefly described in the following; it is obvious that the described drawings are only related to some embodiments of the disclosure and thus are not limitative to the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the present disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

For a wearable device, the wearable device generally has characteristics of low frequency and low color gamut due to a small size thereof. The low frequency results in a long pixel hold time for each pixel in a frame, and both P-type transistors and N-type transistors have disadvantages of having a leakage current and failing to maintain pixel voltage stability for a long time.

Currently, MIP (memory-in-pixel) technology can be implemented by using static random access memory (SRAM) or visible light communication (VLC), the SRAM mainly comprises two CMOS NOT gates, each CMOS NOT gate includes a P-type transistor (such as, a PMOS) and an N-type transistor (such as, an NMOS). However, in a current preparation process of a transistor, an amorphous silicon (a-Si) production line has been formed, that is, a preparation process of the NMOS is simple, and a preparation process of the PMOS is difficult and costly, thereby severely limiting the wide application of the MIP technology in wearable devices.

Embodiments of the present disclosure provide a memory-in-pixel circuit and a driving method thereof, a liquid crystal display panel, and a wearable device. The memory-in-pixel circuit is provided with a latch circuit, and the latch circuit can implement a function of latching the data voltage and continuously updating the pixel voltage, so that the voltage stability can be maintained for a long time; the latch circuit merely comprises the NMOS, and no PMOS is needed to be prepared in the production line, so that the cost of mask plates does not required to be increased, and the difficulty of the process technology is low.

It is to be noted that, transistors used in the embodiments of the present disclosure may be thin film transistors (such as, polysilicon thin film transistors, amorphous silicon thin film transistors, oxide thin film transistors or organic thin film transistors), field effect transistors or other switch devices with the same characteristics. A source electrode and a drain electrode of the transistor used herein may be symmetrical in structure, so the source electrode and the drain electrode of the transistor may have no difference in structure. In the embodiments of the present disclosure, in order to distinguish two electrodes of the transistor apart from a gate electrode, one of the two electrodes is directly referred to as a first electrode, and the other of the two electrodes is referred to as a second electrode, and therefore the first electrode and the second electrode of all or part of the transistors in the embodiments of the present disclosure are interchangeable as required. For example, the first electrode of the transistor described in the embodiments of the present disclosure may be the source electrode, and the second electrode may be the drain electrode; alternatively, the first electrode of the transistor may be the drain electrode, and the second electrode may be the source electrode.

For example, the transistors may be classified into N-type transistors and P-type transistors according to the characteristics of the transistors. For clarity, the embodiments of the present disclosure illustrate the technical solution of the present disclosure in detail by taking the transistors as N-type transistors as an example. However the transistors in the embodiments of the present disclosure are not limited to the N-type transistors, in addition to the transistors in the latch circuit, one of ordinary skill in the art also can use the P-type transistors to implement one or more of the transistors in the embodiments of the present disclosure according to actual needs.

Hereinafter, a memory-in-pixel circuit and a driving method thereof, a liquid crystal display panel, and a wearable device according to the embodiments of the present disclosure will be described with reference to the accompanying drawings.

Figure 1:
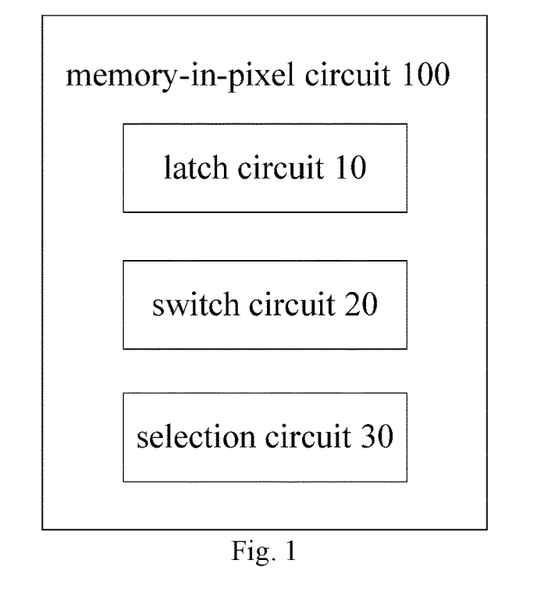
FIG. 1 is a schematic block diagram of a memory-in-pixel circuit according to an embodiment of the present disclosure.
Figure 2:
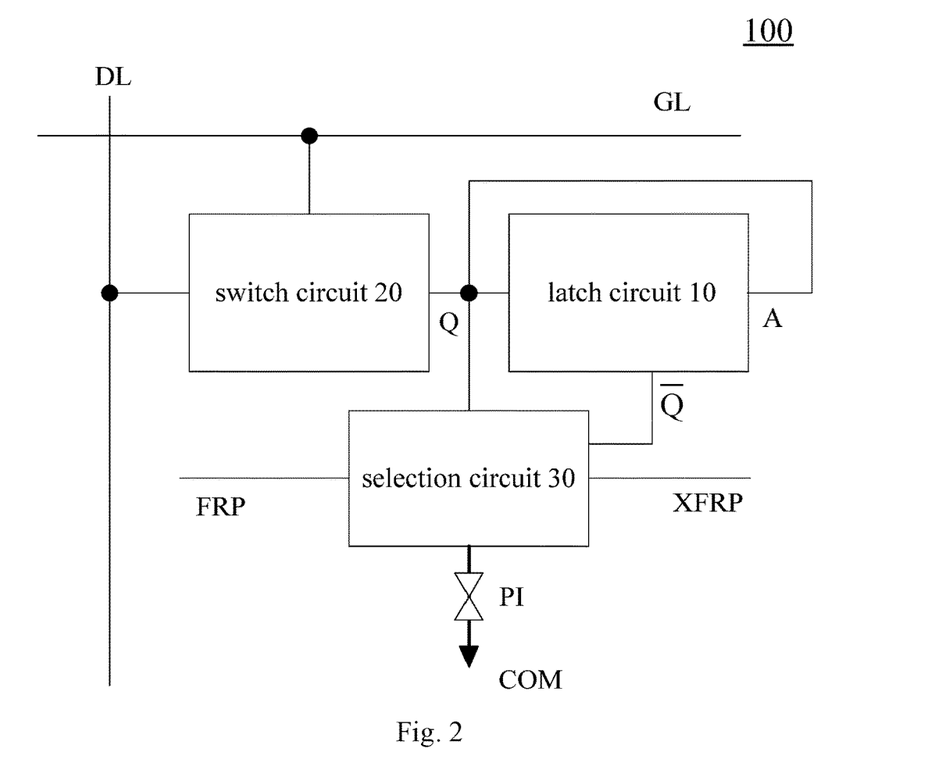
FIG. 2 is a schematic diagram of a memory-in-pixel circuit according to an embodiment of the present disclosure.

FIG. 1 is a schematic block diagram of a memory-in-pixel circuit according to an embodiment of the present disclosure. FIG. 2 is a schematic diagram of a memory-in-pixel circuit according to an embodiment of the present disclosure. As shown in FIG. 1, the memory-in-pixel circuit 100 comprises: a latch circuit 10, a switch circuit 20 and a selection circuit 30. For example, here, the latch circuit, the switch circuit and the selection circuit are respective functional units in the memory-in-pixel circuit, and therefore, may be referred to as a latch unit, a switch unit and a selection unit respectively.

For example, the latch circuit 10 merely comprises first type transistors. All of the transistors included in the latch circuit are transistors of the same type. The first type transistors are N-type transistors. That is, transistors used in the latch circuit 10 are all N-type transistors.

For example, in an embodiment of the present disclosure, as shown in FIG. 2, the latch circuit 10 is electrically connected to the switch circuit 20 and the selection circuit 30 respectively, and is configured to latch a data voltage and generate a first latch signal and a second latch signal. A first end of the switch circuit 20 is electrically connected with a data line DL to receive the data voltage Vdata, a control end of the switch circuit 20 is electrically connected with a scan line GL to receive a row scan signal Vs, and a second end of the switch circuit 20 is electrically connected with an input end of the latch circuit 10 so as to form a first node Q, and the switch circuit 20 is configured to be turned on under control of the row scan signal Vs, so as to provide the data voltage Vdata to the input end of the latch circuit 10, thus the latch circuit 10 can latch the data voltage Vdata and generate the first latch signal and the second latch signal.

For example, a first control end of the selection circuit 30 is electrically connected with the first node Q, a second control end of the selection circuit 30 is electrically connected with a first output end of the latch circuit 10, a first input end of the selection circuit 30 is configured to receive a first selection signal FRP, a second input end of the selection circuit 30 is configured to receive a second selection signal XFRP, and the selection circuit 30 is configured to apply the first selection signal FRP or the second selection signal XFRP to a pixel PI under control of the first latch signal and the second latch signal, and to continue to apply the first selection signal FRP or the second selection signal XFRP to the pixel PI when the switch circuit 20 is turned off, so as to achieve automatic update of the pixel.

Figure 3:
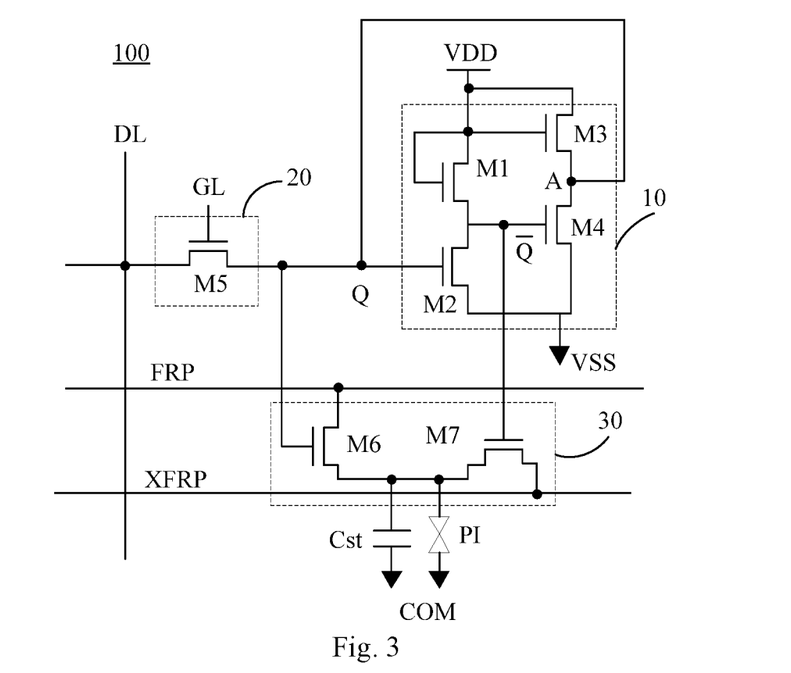
FIG. 3 is a structure schematic diagram of a memory-in-pixel circuit according to an embodiment of the present disclosure.

For example, in an embodiment of the present disclosure, as shown in FIG. 3, the latch circuit 10 comprises: a first latch transistor M1, a second latch transistor M2, a third latch transistor M3 and a fourth latch transistor M4.

For example, a first electrode and a gate electrode of the first latch transistor M1 is electrically connected with a first power supply terminal VDD to receive a first power supply voltage V1. A first electrode of the second latch transistor M2 is electrically connected with a second electrode of the first latch transistor M1 so as to form a second node $\overline{Q}$, a gate electrode of the second latch transistor M2 is electrically connected with the first node Q (that is, a second end of the switch circuit 20), and a second electrode of the second latch transistor M2 is electrically connected with a second power supply terminal VSS to receive a second power supply voltage V2. A first electrode and a gate electrode of the third latch transistor M3 are both electrically connected with the first power supply terminal VDD to receive a first power supply voltage V1. A first electrode of the fourth latch transistor M4 is electrically connected with a second electrode of the third latch transistor M3 so as to form a third node A, a gate electrode of the fourth latch transistor M4 is electrically connected with the second node $\overline{Q}$, a second electrode of the fourth latch transistor M4 is electrically connected with the second power supply terminal VSS to receive the second power supply voltage V2. For example, the third node A is further electrically connected with the first node Q, a voltage signal of the third node A and a voltage signal of the first node Q have the same polarity, that is, a positive feedback is formed between the voltage signal of the third node A and the voltage signal of the first node Q.

For example, the input end of the latch circuit 10 comprises the first node Q, and the first output end of the latch circuit 10 comprises the second node $\overline{Q}$. The latch circuit 10 further comprises a second output end, and the second output end comprises the third node A.

For example, the first latch signal comprises a voltage signal of the second node $\overline{Q}$, and the second latch signal comprises the voltage signal of the third node A, that is, the second latch signal comprises the voltage signal of the first node Q.

For example, a channel width W1 of the first latch transistor M1, a channel width W2 of the second latch transistor M2, a channel width W3 of the third latch transistor M3, and a channel width W4 of the fourth latch transistor M4 satisfy a following relationship: W2=W4=5W1=5W3.

It should be noted that channel lengths of the first latch transistor M1, the second latch transistor M2, the third latch transistor M3 and the fourth latch transistor M4 may all be equal.

For example, the first power supply voltage V1 is a high level signal, and the second power supply voltage V2 is a low level signal.

For example, as shown in FIG. 3, the switch circuit 20 comprises a first transistor M5. A gate electrode of the first transistor M5 is electrically connected with the scan line GL to receive the row scan signal Vs, a first electrode of the first transistor M5 is electrically connected with the data line DL to receive the data voltage Vdata, and a second electrode of the first transistor M5 is electrically connected with the gate electrode of the second latch transistor M2, that is, the second electrode of the first transistor M5 is electrically connected with the first node Q.

For example, as shown in FIG. 3, the selection circuit 30 comprises a second transistor M6 and a third transistor M7. The first control end of the selection circuit 30 comprises a gate electrode of the second transistor M6, the second control end of the selection circuit 30 comprises a gate electrode of the third transistor M7, the first input end of the selection circuit 30 comprises a first electrode of the second transistor M6, and the second input end of the selection circuit 30 comprises a first electrode of the third transistor M7.

For example, the gate electrode of the second transistor M6 is electrically connected with the second electrode of the first transistor M5 and the gate electrode of the second latch transistor M2 respectively, the first electrode of the second transistor M6 receives the first selection signal FRP, and a second electrode of the second transistor M6 is electrically connected with a first end of the pixel PI. A second end of the pixel PI is electrically connected with a reference voltage output terminal COM to receive a reference voltage Vcom. The gate electrode of the third transistor M7 is electrically connected with the second node $\overline{Q}$, the first electrode of the third transistor M7 receives the second selection signal XFRP, and a second electrode of the third transistor M7 is electrically connected with the first end of the pixel PI and the second electrode of the second transistor M6 respectively.

For example, as shown in FIG. 3, the memory-in-pixel circuit further comprises a storage circuit. The storage circuit comprises a storage capacitor Cst. A first end of the storage capacitor Cst is electrically connected with the first end of the pixel PI, and a second end of the storage capacitor Cst is electrically connected with the reference voltage output terminal COM to receive the reference voltage Vcom. However, the present disclosure is not limited thereto, and the second end of the storage capacitor Cst may also be electrically connected with the scan line GL.

It should be noted that, in the present disclosure, for example, the first end of the pixel PI may be a pixel electrode, and the second end of the pixel PI may be a common electrode. The first selection signal FRP or the second selection signal XFRP may be applied to the first end of the pixel PI, that is, the first selection signal FRP or the second selection signal XFRP may be applied to the pixel electrode.

An operation principle of the memory-in-pixel circuit provided by an embodiment of the present disclosure will be described below with reference to a circuit diagram shown in FIG. 3 and timing diagrams shown in FIG. 4 and FIG. 5.

Figure 4:
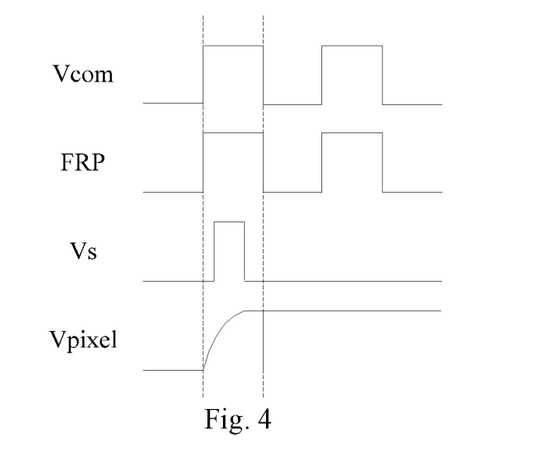
FIG. 4 is a signal timing diagram of a memory-in-pixel circuit according to an embodiment of the present disclosure.

For example, as shown in FIG. 3 and FIG. 4, because the first power supply voltage V1 is a high level signal, the first latch transistor M1 and the third latch transistor M3 are turned on, in a case where the row scan signal Vs is a high level signal to control the first transistor M5 to be turned on, and the data voltage Vdata is a high level signal, the voltage signal of the first node Q is a high level signal, so the second transistor M6 and the second latch transistor M2 are turned on, the second power supply voltage V2 is transmitted to the second node $\overline{Q}$ via the second latch transistor M2, so that the voltage signal of the second node $\overline{Q}$ is a low level signal, the third transistor M7 and the fourth latch transistor M4 are turned off, the first power supply voltage V1 is transmitted to the third node A via the third latch transistor M3, as a result, the voltage signal of the third node A is a high level signal, a positive feedback is formed between the third node A and the first node Q, so that the data voltage Vdata is latched. When the row scan signal Vs is a low level signal to control the first transistor M5 to be turned off, the voltage signal of the first node Q can be still maintained at a high level, the second transistor M6 is turned on, so that the first selection signal FRP can be continuously applied to the pixel PI through the second transistor M6 to achieve automatic update of the pixel.

Figure 5:
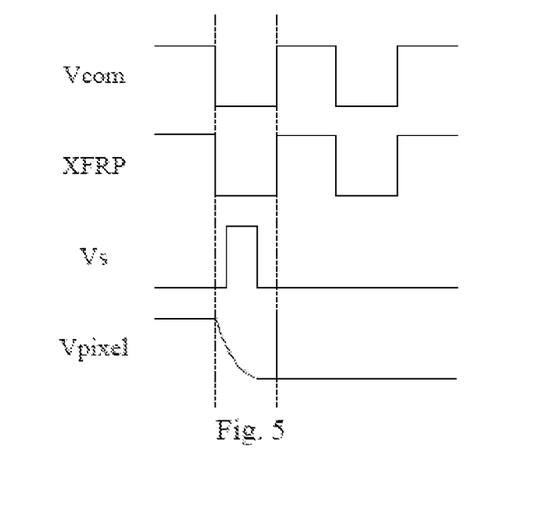
FIG. 5 is a signal timing diagram of another memory-in-pixel circuit according to an embodiment of the present disclosure.

For example, as shown in FIG. 3 and FIG. 5, because the first power supply voltage V1 is a high level signal, the first latch transistor M1 and the third latch transistor M3 are turned on, in a case where the row scan signal Vs is a high level signal to control the first transistor M5 to be turned on, and the data voltage Vdata is a low level signal, the voltage signal of the first node Q is a low level signal, so the second transistor M6 and the second latch transistor M2 are turned off, the first power supply voltage V1 is transmitted to the second node $\overline{Q}$ via the first latch transistor M1, so that the voltage signal of the second node $\overline{Q}$ is a high level signal, the third transistor M7 and the fourth latch transistor M4 are turned on. Because the channel width W3 of the third latch transistor M3 is smaller than the channel width W4 of the fourth latch transistor M4 (for example, W4=5W3), a potential of the third node A may be still pulled down to the second power voltage V2 through the fourth latch transistor M4, therefore, the voltage signal of the third node A is a low level signal, positive feedback is formed between the third node A and the first node Q, so that the data voltage Vdata is latched. When the row scan signal Vs is a low level signal, so that the first transistor M5 is turned off, the voltage signal of the first node Q can be still maintained at a low level, thus the voltage signal of the second node $\overline{Q}$ is a high level signal, the third transistor M7 is turned on, therefore the second selection signal XFRP can be continuously applied to the pixel PI through the third transistor M7 to implement automatic update of the pixel.

For example, the first selection signal FRP and the second selection signal XFRP may be alternately applied to the first end of the pixel PI (that is, the pixel electrode). For example, the first selection signal FRP is applied to the first end of the pixel PI at odd frames, and the second selection signal XFRP is applied to the first end of the pixel PI at even frames.

For example, as shown in FIG. 3 and FIG. 4, the second transistor M6 is turned on, and the third transistor M7 is turned off, the first selection signal FRP is applied to the first end of the pixel PI to charge the pixel PI. A voltage Vpixel on the first end of the pixel PI gradually increases, the reference voltage Vcom output from the reference voltage output terminal COM is a high level signal, when the charging of the pixel PI is completed, the voltage Vpixel on the first end of the pixel PI is greater than the reference voltage Vcom, and a forward voltage is applied to liquid crystal molecules in this case. As shown in FIG. 3 and FIG. 5, the second transistor M6 is turned off, and the third transistor M7 is turned on, the second selection signal XFRP is applied to the first end of the pixel PI to charge the pixel PI. The voltage Vpixel on the first end of the pixel PI gradually decreases, the reference voltage Vcom output from the reference voltage output terminal COM is a low level signal, when the charging of the pixel PI is completed, the voltage Vpixel on the first end of the pixel PI is smaller than the reference voltage Vcom, a negative voltage is applied to the liquid crystal molecules in this case, thereby implementing the polarity inversion of the liquid crystal molecules.

It should be noted that, in the example shown in FIG. 4, the reference voltage Vcom is a high level signal, but in the example shown in FIG. 5, the reference voltage Vcom is a low level signal, however, the present disclosure is not limited thereto, the reference voltage Vcom, for example, may remain unchanged, that is, in the examples shown in FIG. 4 and FIG. 5, the reference voltage Vcom is the same, for example, Vcom=(VFRP+VXFRP)/2, where VFRP denotes the first selection signal FRP, and VXFRP denotes the second selection signal XFRP.

In summary, according to the memory-in-pixel circuit provided by the embodiments of the present disclosure, a function of latching the data voltage can be achieved by the latch circuit only including the NMOS, so that the pixel voltage can be continuously updated and the voltage can maintain stability for a long time. In addition, no PMOS is needed to be prepared on the production line, so that the cost of mask plates does not required to be increased, and the difficulty of the process technology is low.

Figure 6:
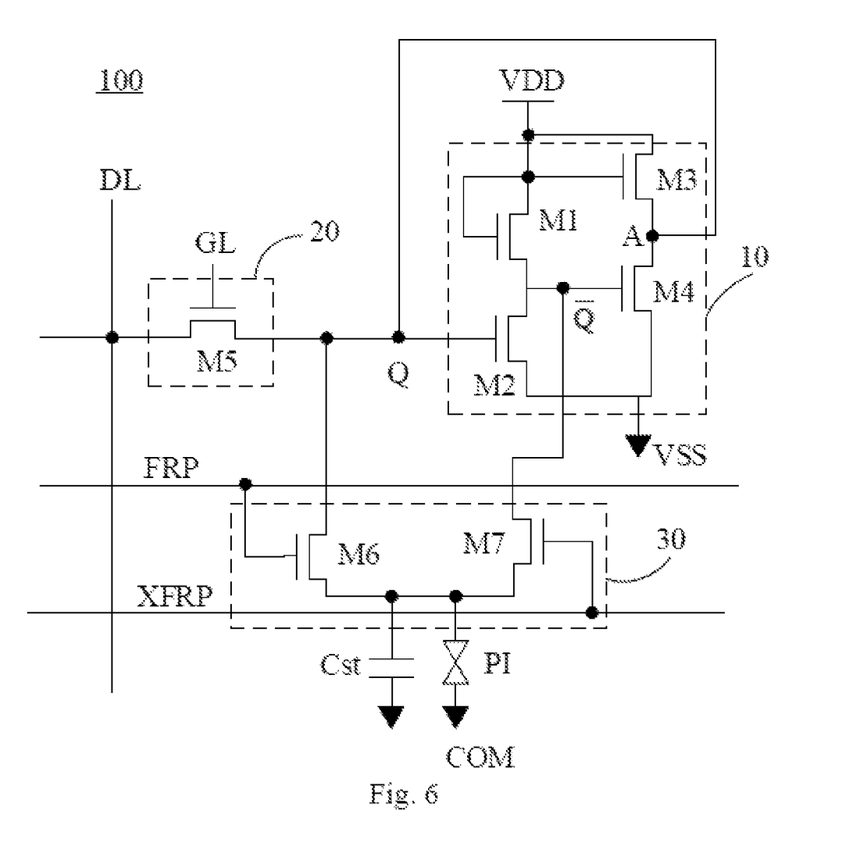
FIG. 6 is a structure schematic diagram of a memory-in-pixel circuit according to another embodiment of the present disclosure.

FIG. 6 is a structure schematic diagram of a memory-in-pixel circuit according to another embodiment of the present disclosure.

For example, as shown in FIG. 1 and FIG. 6, in another embodiment, the latch circuit 10 merely comprises first type transistors, and is configured to latch a data voltage and generate a first latch signal and a second latch signal. For example, the first type transistors are N-type transistors.

For example, a first end of the switch circuit 20 is electrically connected with a data line DL to receive the data voltage Vdata, a control end of the switch circuit 20 is electrically connected with a scan line GL to receive a row scan signal Vs, and a second end of the switch circuit 20 is electrically connected with the selection circuit 30, and the switch circuit 20 is configured to provide the data voltage Vdata to an input end of the latch circuit 10 when the switch circuit 20 is turned on.

For example, a first input end of the selection circuit 30 is electrically connected with a second output end of the latch circuit 10, a second input end of the selection circuit 30 is electrically connected with a first output end of the latch circuit 10, a first control end of the selection circuit 30 is configured to receive a first selection signal FRP, and a second control end of the selection circuit 30 is configured to receive a second selection signal XFRP, and the selection circuit 30 is configured to apply the first latch signal or the second latch signal to a pixel PI under control of the first selection signal FRP and the second selection signal XFRP, and to continue to apply the first latch signal or the second latch signal to the pixel PI when the switch circuit 20 is turned off, so as to achieve automatic update of the pixel.

For example, in an example, as shown in FIG. 6, the latch circuit 10 comprises a first latch transistor M1, a second latch transistor M2, a third latch transistor M3 and a fourth latch transistor M4.

For example, a first electrode and a gate electrode of the first latch transistor M1 is electrically connected with a first power supply terminal VDD to receive a first power supply voltage V1. A gate electrode of the second latch transistor M2 is electrically connected with the first node Q, a first electrode of the second latch transistor M2 is electrically connected with a second electrode of the first latch transistor M1 so as to form a second node $\overline{Q}$, and a second electrode of the second latch transistor M2 is electrically connected with a second power supply terminal VSS to receive a second power supply voltage V2. A first electrode and a gate electrode of the third latch transistor M3 are both electrically connected with the first power supply terminal VDD to receive the first power supply voltage V1. A first electrode of the fourth latch transistor M4 is electrically connected with a second electrode of the third latch transistor M3 so as to form a third node A, a gate electrode of the fourth latch transistor M4 is electrically connected with the second node $\overline{Q}$, a second electrode of the fourth latch transistor M4 is electrically connected with the second power supply terminal VSS to receive the second power supply voltage V2. For example, the third node A is further electrically connected with the first node Q, a voltage signal of the third node A and a voltage signal of the first node Q have the same polarity, that is, a positive feedback is formed between the voltage signal of the third node A and the voltage signal of the first node Q. The polarity of the voltage signal of the second node $\overline{Q}$ is opposite to the polarity of the voltage signal of the first node Q.

For example, the input end of the latch circuit 10 comprises the first node Q, and the first output end of the latch circuit 10 comprises the second node $\overline{Q}$, and the second output end of the latch circuit 10 comprises the third node A.

For example, the first latch signal comprises the voltage signal of the second node $\overline{Q}$, and the second latch signal comprises the voltage signal of the third node A, that is, the second latch signal comprises the voltage signal of the first node Q.

For example, a channel width of the first latch transistor M1 is identical to a channel width of the third latch transistor M3, a channel width of the second latch transistor M2 is identical to a channel width of the fourth latch transistor M4, and the channel width of the first latch transistor M1 is smaller than the channel width of the second latch transistor M2.

For example, the channel width of the first latch transistor M1 is represented as W1, the channel width of the second latch transistor M2 is represented as W2, the channel width of the third latch transistor M3 is represented as W3, and the channel width of the fourth latch transistor M4 is represented as W4. W1, W2, W3, and W4 satisfy a relationship: W2=W4≥5W1=5W3.

It should be noted that channel lengths of the first latch transistor M1, the second latch transistor M2, the third latch transistor M3 and the fourth latch transistor M4 may all be equal.

For example, the first power supply voltage V1 is a high level signal, and the second power supply voltage V2 is a low level signal.

For example, in an example, as shown in FIG. 6, the selection circuit 30 comprises a second transistor M6 and a third transistor M7. The first control end of the selection circuit 30 comprises a gate electrode of the second transistor M6, the second end of the selection circuit 30 comprises a gate electrode of the third transistor M7, the first input end of the selection circuit 30 comprises a first electrode of the second transistor M6, and the second input end of the selection circuit 30 comprises a first electrode of the third transistor M7.

For example, the gate electrode of the second transistor M6 is configured to receive the first selection signal FRP, the first electrode of the second transistor M6 is electrically connected with the first node Q, a second electrode of the second transistor M6 is electrically connected with a first end of the pixel PI, and a second end of the pixel PI is electrically connected with a reference voltage output terminal COM to receive a reference voltage Vcom.

For example, the gate electrode of the third transistor M7 is configured to receive the second selection signal XFRP, the first electrode of the third transistor M7 is electrically connected with the second node $\overline{Q}$, and a second electrode of the third transistor M7 is electrically connected with the first end of the pixel PI.

It should be noted that, in the present disclosure, for example, the first end of the pixel PI may be a pixel electrode, and the second end of the pixel PI may be a common electrode. The first latch signal or the second latch signal may be applied to the first end of the pixel PI, that is, the first latch signal or the second latch signal may be applied to the pixel electrode.

For example, in an example, as shown in FIG. 6, the switch circuit 20 comprises a first transistor M5. A gate electrode of the first transistor M5 is electrically connected with the scan line GL to receive the row scan signal Vs, a first electrode of the first transistor M5 is electrically connected with the data line DL to receive the data voltage Vdata, and a second electrode of the first transistor M5 is electrically connected with the first node Q, that is, the second electrode of the first transistor M5 is electrically connected with the first electrode of the second transistor M6.

For example, the first latch signal and the second latch signal may be alternately applied to the first end of the pixel PI (that is, the pixel electrode), for example, the first selection signal FRP is applied to the gate electrode of the second transistor M6 at odd frames, so that the second transistor M6 is turned on, and the voltage signal of the first node Q (that is, the second latch signal) is transmitted to the pixel PI; the second selection signal XFRP is applied to the gate electrode of the third transistor M7 at even frames, so that the third transistor M7 is turned on, and the voltage signal of the second node $\overline{Q}$ (that is, the first latch signal) is transmitted to the pixel PI, thereby implementing the frame inversion.

Figure 7:
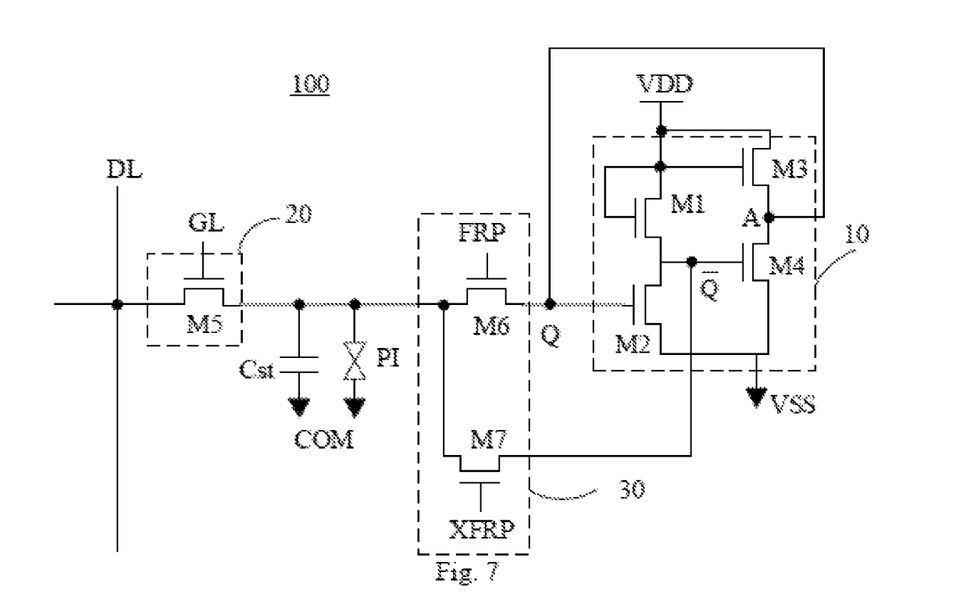
FIG. 7 is a structure schematic diagram of a memory-in-pixel circuit according to still another embodiment of the present disclosure.

FIG. 7 is a structure schematic diagram of a memory-in-pixel circuit according to still another embodiment of the present disclosure. The memory-in-pixel circuit shown in FIG. 7 is similar to the memory-in-pixel circuit shown in FIG. 6, but a connection manner of the pixel in the memory-in-pixel circuit shown in FIG. 7 is different from the connection manner of the pixel in the memory-in-pixel circuit shown in FIG. 6.

For example, as shown in FIG. 7, the selection circuit 30 comprises a second transistor M6 and a third transistor M7. A gate electrode of the second transistor M6 is configured to receive the first selection signal FRP, a first electrode of the second transistor M6 is electrically connected with the first node Q, a second electrode of the second transistor M6 is electrically connected with a first end of the pixel PI, and a second end of the pixel PI is electrically connected with a reference voltage output terminal COM to receive a reference voltage Vcom. A gate electrode of the third transistor M7 is configured to receive the second selection signal XFRP, a first electrode of the third transistor M7 is electrically connected with the second node $\overline{Q}$, and a second electrode of the third transistor M7 is electrically connected with the first end of the pixel PI.

For example, as shown in FIG. 7, the switch circuit 20 comprises a first transistor M5. A gate electrode of the first transistor M5 receives the row scan signal Vs, a first electrode of the first transistor M5 receives the data voltage Vdata, and a second electrode of the first transistor M5 is electrically connected with the second electrode of the second transistor M6 and the second electrode of the third transistor M7, that is, the second electrode of the first transistor M5 is electrically connected with the first end of the pixel PI.

For example, as shown in FIG. 6 and FIG. 7, the memory-in-pixel circuit further comprises a storage circuit. The storage circuit comprises a storage capacitor Cst. A first end of the storage capacitor Cst is electrically connected with the first end of the pixel PI, and a second end of the storage capacitor Cst is electrically connected with the reference voltage output terminal COM to receive the reference voltage Vcom.

An operation principle of the memory-in-pixel circuit shown in FIG. 6 is similar to an operation principle of the memory-in-pixel circuit shown in FIG. 7, the operation principle of the memory-in-pixel circuit provided by an embodiment of the present disclosure will be described below with reference to the circuit diagram shown in FIG. 6 and the timing diagram shown in FIG. 8.

Figure 8:
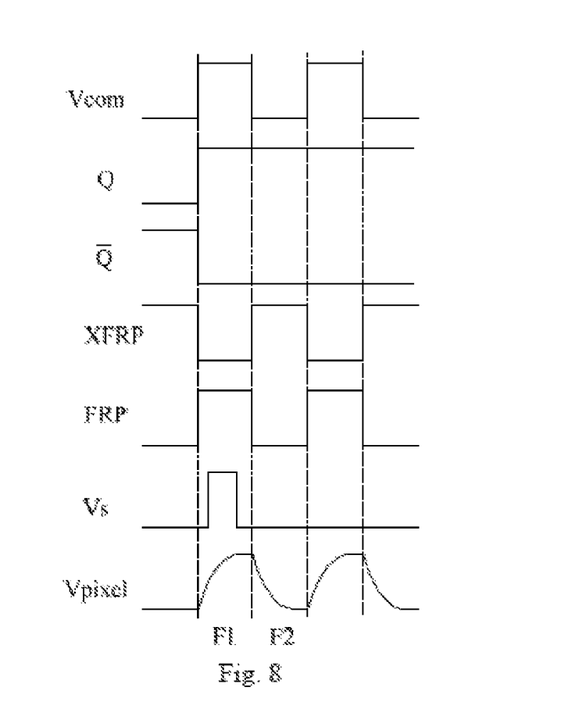
FIG. 8 is a signal timing diagram of a memory-in-pixel circuit according to another embodiment of the present disclosure.

For example, because the first power supply voltage V1 is a high level signal, the first latch transistor M1 and the third latch transistor M3 are turned on, as shown in FIG. 6 and FIG. 8, in a case where the row scan signal Vs is a high level signal to control the first transistor M5 to be turned on, and the data voltage Vdata is a high level signal, the voltage signal of the first node Q is a high level signal, the second latch transistor M2 is turned on, the second power supply voltage V2 is transmitted to the second node $\overline{Q}$ via the second latch transistor M2, so that the voltage signal of the second node $\overline{Q}$ is a low level signal, the fourth latch transistor M4 is turned off, the first power supply voltage V1 is transmitted to the third node A via the third latch transistor M3, as a result, the voltage signal of the third node A is a high level signal, a positive feedback is formed between the third node A and the first node Q, so as to implement latching of the data voltage Vdata.

For example, as shown in FIG. 8, in a first frame F1, the first selection signal FRP is a high level signal, the second selection signal XFRP is a low level signal, so that the second transistor M6 is turned on and the third transistor M7 is turned off, the voltage signal of the first node Q is transmitted to the pixel PI via the second transistor M6. In a case where the row scan signal Vs is a low level signal to control the first transistor M5 to be turned off, the voltage signal of the first node Q can be still maintained at a high level, when the first selection signal FRP controls the second transistor M6 to be turned on, the voltage signal of the first node Q may be continuously applied to the pixel PI through the second transistor M6 to achieve automatic update of the pixel.

For example, as shown in FIG. 8, in a second frame F2, the first selection signal FRP is a low level signal, the second selection signal XFRP is a high level signal, so that the second transistor M6 is turned off and the third transistor M7 is turned on, because the voltage signal of the first node Q is still maintained at a high level, the voltage signal of the second node $\overline{Q}$ is maintained at a low level, the voltage signal of the second node $\overline{Q}$ is transmitted to the pixel PI through the third transistor M7 to achieve automatic update of the pixel.

For example, the first selection signal FRP is a high level signal at odd frames, and the first selection signal FRP is a low level signal at even frames; the second selection signal XFRP is a low level signal at the odd frames, and the second selection signal XFRP is a high level signal at the even frames, so that the voltage signal of the first node Q and the voltage signal of the second node $\overline{Q}$ can be alternately applied to the pixel PI. The polarity of the voltage signal of the first node Q and the polarity of the voltage signal of the second node $\overline{Q}$ are opposite, so that the display panel implements frame inversion.

It should be noted that, the memory-in-pixel circuit provided by the embodiments of the present disclosure is not limited to the structures described in the above embodiments. For example, as required, the memory-in-pixel circuit may further comprise a transmission transistor, a detection transistor, a reset transistor, and the like. For another example, according to actual application requirements, the memory-in-pixel circuit may also have an electrical compensation function to compensate the threshold voltage drift of transistors. For example, the compensation function may be implemented by voltage compensation, current compensation, or a combination of the voltage compensation and the current compensation, which can be internal compensation or external compensation.

Figure 9:
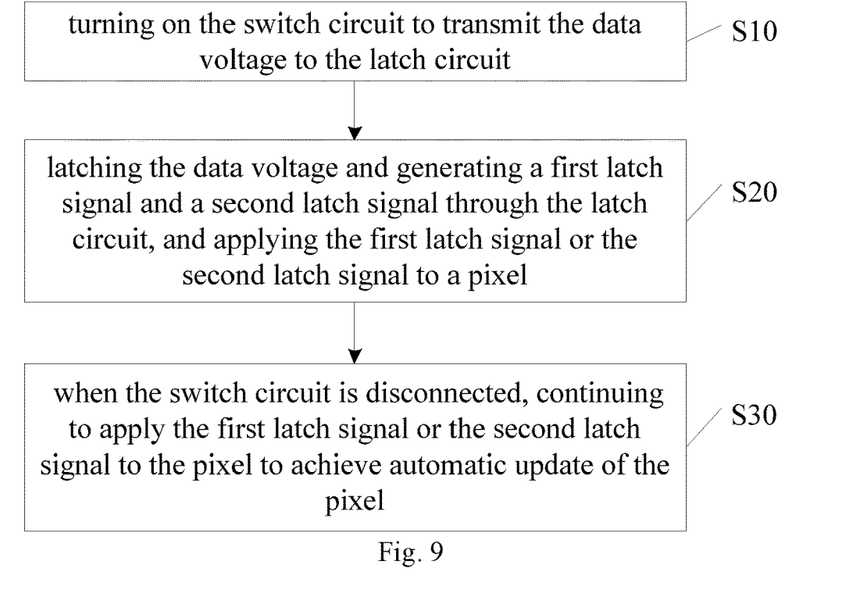
FIG. 9 is a flow chart of a driving method according to an embodiment of the present disclosure.

An embodiment of the present disclosure further provides a driving method, FIG. 9 is a flow chart of a driving method according to an embodiment of the present disclosure, the driving method is applied to the memory-in-pixel circuits shown in FIG. 6 and FIG. 7 described above. For example, as shown in FIG. 9, the driving method comprises:

S10: turning on the switch circuit to transmit the data voltage to the latch circuit;

S20: latching the data voltage and generating a first latch signal and a second latch signal through the latch circuit, and applying the first latch signal or the second latch signal to a pixel;

S30: when the switch circuit is turned off, continuing to apply the first latch signal or the second latch signal to the pixel to achieve automatic update of the pixel.

For example, a specific operation process of the driving method can be referred to the operation principles of the memory-in-pixel circuits shown in FIG. 6 and FIG. 7 above. For specific description of the switch circuit and the latch circuit, etc., reference may be made to the related description in the memory-in-pixel circuit described in any one of the above embodiments, and the repeated portions will be omitted here.

Figure 10:
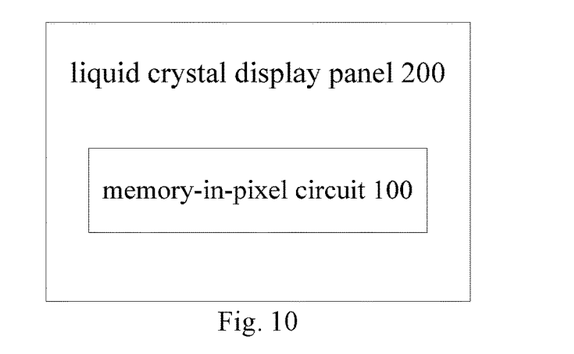
FIG. 10 is a block diagram of a liquid crystal display panel according to an embodiment of the present disclosure.

An embodiment of the present disclosure further provides a liquid crystal display panel, FIG. 10 is a block diagram of a liquid crystal display panel according to an embodiment of the present disclosure. As shown in FIG. 10, the liquid crystal display panel 200 comprises the memory-in-pixel circuit 100 described in any one of the above embodiments of the present disclosure.

The liquid crystal display panel according to the embodiments of the present disclosure comprises the above mentioned memory-in-pixel circuit, so the liquid crystal display panel can latch the data voltage to implement the automatic update of the pixel, in addition, no PMOS is needed to be prepared, the cost of mask plates does not required to be increased, and the difficulty of the process technology is low.

For example, the liquid crystal display panel 200 may further comprise a gate driving circuit, a data driving circuit, and the like, the gate driving circuit is configured to provide row scan signals to the memory-in-pixel circuit 100 through scan lines, and the data driving circuit is configured to provide data voltages to the memory-in-pixel circuit 100 through data lines.

Figure 11:
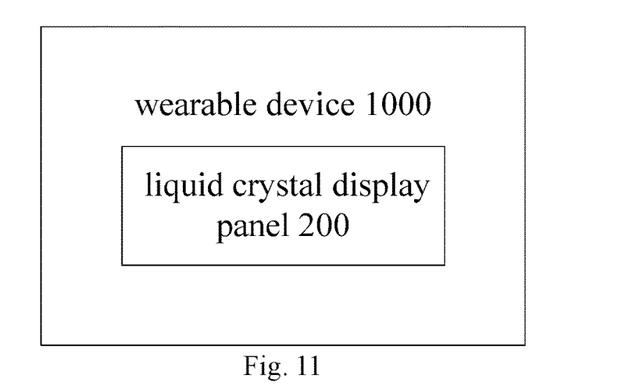
FIG. 11 is a block diagram of a wearable device according to an embodiment of the present disclosure.

An embodiment of the present disclosure further provides a wearable device. FIG. 11 is a block diagram of a wearable device according to an embodiment of the present disclosure. As shown in FIG. 11, the wearable device 1000 comprises the liquid crystal display panel 200 described in any one of the above embodiments.

For example, the wearable device 1000 may comprise a smart watch, a smart bracelet, and the like.

The wearable device according to the embodiments of the present disclosure comprises the above mentioned liquid crystal display panel, so in the production line, no PMOS is needed to be prepared, the cost of mask plates does not required to be increased, and the difficulty of the process technology is low.

It should be noted that other components of the wearable device according to the embodiment of the present disclosure and functions of the other components are known to those skilled in the art, and detail descriptions will be omitted here.

Although detailed description has been given above to the present disclosure with general description and embodiments, it shall be apparent to those skilled in the art that some modifications or improvements may be made on the basis of the embodiments of the present disclosure. Therefore, all the modifications or improvements made without departing from the spirit of the present disclosure shall all fall within the scope of protection of the present disclosure.

What is claimed is:

1. A memory-in-pixel circuit, comprising: a latch circuit, a switch circuit and a selection circuit, wherein all transistors included in the latch circuit merely are first type transistors, and the latch circuit is configured to latch a data voltage and generate a first latch signal and a second latch signal; a first end of the switch circuit is electrically connected with a data line to receive the data voltage, a control end of the switch circuit receives a row scan signal, and the second end of the switch circuit is electrically connected with the selection circuit, and the switch circuit is configured to provide the data voltage to an input end of the latch circuit upon the switch circuit being turned on; and a first input end of the selection circuit is electrically connected with a second output end of the latch circuit, a second input end of the selection circuit is electrically connected with a first output end of the latch circuit, a first control end of the selection circuit is configured to receive a first selection signal, and a second control end of the selection circuit is configured to receive a second selection signal, and the selection circuit is configured to apply the first latch signal or the second latch signal to a pixel under control of the first selection signal and the second selection signal, and to continue to apply the first latch signal or the second latch signal to the pixel upon the switch circuit being turned off, so as to achieve automatic update of the pixel, wherein the latch circuit comprises: a first latch transistor, a first electrode and a gate electrode of the first latch transistor being electrically connected with a first power supply terminal; a second latch transistor, a gate electrode of the second latch transistor being electrically connected with the first node, a first electrode of the second latch transistor being electrically connected with a second electrode of the first latch transistor so as to form a second node, and a second electrode of the second latch transistor being electrically connected with a second power supply terminal; a third latch transistor, both a first electrode and a gate electrode of the third latch transistor being electrically connected with the first power supply terminal; and a fourth latch transistor, a first electrode of the fourth latch transistor being electrically connected with a second electrode of the third latch transistor so as to form a third node, a gate electrode of the fourth latch transistor being electrically connected with the second node, a second electrode of the fourth latch transistor being electrically connected with the second power supply terminal, wherein the third node is further electrically connected with the first node, the input end of the latch circuit comprises the first node, the first output end of the latch circuit comprises the second node, and the second output end of the latch circuit comprises the third node.

2. The memory-in-pixel circuit according to claim 1, wherein the first type transistors are N-type transistors.

3. The memory-in-pixel circuit according to claim 1, wherein the first latch signal comprises a voltage signal of the second node, and the second latch signal comprises a voltage signal of the third node.

4. The memory-in-pixel circuit according to claim 1, wherein a channel width of the first latch transistor is identical to a channel width of the third latch transistor, a channel width of the second latch transistor is identical to a channel width of the fourth latch transistor, and the channel width of the first latch transistor is smaller than the channel width of the second latch transistor.

5. The memory-in-pixel circuit according to claim 1, wherein the channel width W1 of the first latch transistor and the channel width W2 of the second latch transistor have a following relationship: W2≥5W1.

6. The memory-in-pixel circuit according to claim 1, wherein the selection circuit comprises:

a second transistor, a gate electrode of the second transistor being configured to receive the first selection signal, a first electrode of the second transistor being electrically connected with the first node, a second electrode of the second transistor being electrically connected with a first end of the pixel, and a second end of the pixel being electrically connected with a reference voltage output terminal to receive a reference voltage;

a third transistor, a gate electrode of the third transistor being configured to receive the second selection signal, a first electrode of the third transistor being electrically connected with the second node, and a second electrode of the third transistor being electrically connected with the first end of the pixel.

7. The memory-in-pixel circuit according to claim 6, wherein the switch circuit comprises: a first transistor, a gate electrode of the first transistor receiving the row scan signal, a first electrode of the first transistor receiving the data voltage, and a second electrode of the first transistor being electrically connected with the second electrode of the second transistor and the second electrode of the third transistor.

8. The memory-in-pixel circuit according to claim 6, wherein the switch circuit comprises: a first transistor, a gate electrode of the first transistor receiving the row scan signal, a first electrode of the first transistor receiving the data voltage, and a second electrode of the first transistor being electrically connected with the first electrode of the second transistor.

9. A driving method for driving the memory-in-pixel circuit according to claim 1, comprising:

turning on the switch circuit to transmit the data voltage to the latch circuit;

latching the data voltage and generating a first latch signal and a second latch signal through the latch circuit, and applying the first latch signal or the second latch signal to a pixel; and when the switch circuit is turned off, continuing to apply the first latch signal or the second latch signal to the pixel to achieve automatic update of the pixel.

10. A liquid crystal display panel, comprising the memory-in-pixel circuit according to claim 1.

11. A wearable device, comprising the liquid crystal display panel according to claim 10.

\* \* \* \* \*